US011297797B2

(12) United States Patent
Keller

(10) Patent No.: US 11,297,797 B2
(45) Date of Patent: Apr. 12, 2022

(54) ANIMAL CONTAINMENT SYSTEM

(71) Applicant: Adam J Keller, Fremont, WI (US)

(72) Inventor: Adam J Keller, Fremont, WI (US)

( * ) Notice: Subject to any disclaimer, the term of this patent is extended or adjusted under 35 U.S.C. 154(b) by 142 days.

(21) Appl. No.: 16/376,006

(22) Filed: Apr. 5, 2019

(65) Prior Publication Data

US 2020/0315132 A1   Oct. 8, 2020

(51) Int. Cl.
*A01K 1/035* (2006.01)
*A01K 1/03* (2006.01)
*A01K 1/00* (2006.01)

(52) U.S. Cl.
CPC ............ *A01K 1/0356* (2013.01); *A01K 1/031* (2013.01); *A01K 1/0047* (2013.01)

(58) Field of Classification Search
CPC .... A01K 1/0356; A01K 1/031; A01K 1/0047; A01K 1/0035; A01K 1/0236; A01K 97/04; A01K 31/04
USPC .............................................. 43/55; 119/72.5
See application file for complete search history.

(56) References Cited

U.S. PATENT DOCUMENTS

| | | | | |
|---|---|---|---|---|
| 2,467,525 A * | 4/1949 | Fricke | .................. | A01K 1/0356 119/417 |
| 2,530,170 A * | 11/1950 | Miller | .................. | A01K 1/0245 229/120.1 |
| 2,988,044 A * | 6/1961 | Adelberg | ............... | A01K 1/031 119/417 |
| 3,002,492 A * | 10/1961 | Naturale | ............... | A01K 1/0356 119/475 |
| 3,122,127 A * | 2/1964 | Shechmeister | ...... | A01K 1/0356 119/417 |
| 3,251,342 A * | 5/1966 | Kay | ..................... | A01K 1/0356 119/475 |
| 3,256,859 A * | 6/1966 | Petit, Jr. | ............... | A01K 1/0356 119/475 |
| 3,334,614 A * | 8/1967 | Gass | .................... | A01K 1/0356 119/475 |

(Continued)

OTHER PUBLICATIONS

Amazon (Brand: Lee's), Lee's Kricket Keeper, Nov. 3, 2017, Amazon, Webpage, https://www.amazon.com/Lees-20078-Kricket-Keeper-Large/dp/B0002DHAWQ/ref=sr_1_2?dchild=1&keywords=lee%27s%2Bkricket%2Bkeeper&qid=1626363295&sr=8-2&th=1 (Year: 2017).*

(Continued)

*Primary Examiner* — Brady W Frazier
*Assistant Examiner* — Jodutt Basrawi
(74) *Attorney, Agent, or Firm* — Smith Keane LLP

(57) ABSTRACT

Systems and methods directed to small animal containment and/or breeding include a container top having a vent and a feeding chute. The vent is a plurality of similarly sized holes or a void configured to receive and/or be covered by an exchangeable vent plate or cover. The feeding chute preferably provides a cradle to receive food that can be accessed by a contained animal through the thickness of the chute. A water aperture through the container top is configured to receive a ball bearing sipping tube which is operatively coupled to a water supply implement, but a chew shield is preferably formed integrally as part of the container top to prevent access to through the container top to the water supply implement. Hollow, single-end capped tubes may be provided to extend through one or more apertures formed through the top to allow for small animal or insect extraction.

5 Claims, 21 Drawing Sheets

(56) References Cited

U.S. PATENT DOCUMENTS

| | | | | |
|---|---|---|---|---|
| 3,518,971 A * | 7/1970 | Gass | A01K 1/031 | 119/479 |
| 3,537,428 A * | 11/1970 | Montgomery | A01K 1/031 | 119/419 |
| 3,572,293 A * | 3/1971 | Schroen | A01K 1/0356 | 119/475 |
| 3,699,925 A * | 10/1972 | Van Dongen | A01K 1/0356 | 119/475 |
| 3,752,124 A * | 8/1973 | Gabriel | A01K 7/02 | 119/72.5 |
| 3,791,346 A * | 2/1974 | Willinger | A01K 1/035 | 119/456 |
| 3,951,105 A * | 4/1976 | Mehn | A01K 1/0356 | 119/475 |
| 4,030,226 A * | 6/1977 | Shelton, Sr. | A01K 97/04 | 43/55 |
| 4,784,084 A | 11/1988 | Kohguchi et al. | | |
| 5,311,836 A * | 5/1994 | Sheaffer | A01K 1/031 | 119/419 |
| 5,349,923 A * | 9/1994 | Sheaffer | A01K 1/031 | 119/418 |
| 5,431,129 A * | 7/1995 | Clark | A01K 31/06 | 119/459 |
| 5,924,384 A * | 7/1999 | Deitrich | A01K 1/0356 | 119/416 |
| 6,138,610 A | 10/2000 | Niki | | |
| 6,766,768 B1 * | 7/2004 | Ver Hage | A01K 1/031 | 119/452 |
| 7,467,602 B2 | 12/2008 | Yoshida | | |
| 9,510,559 B2 | 12/2016 | Oshima et al. | | |
| 2004/0172875 A1 * | 9/2004 | Schultz | A01K 97/04 | 43/55 |
| 2005/0066908 A1 * | 3/2005 | Park | A01K 1/031 | 119/419 |
| 2008/0134984 A1 * | 6/2008 | Conger | A01K 1/031 | 119/417 |
| 2014/0245966 A1 * | 9/2014 | Oshima | A01K 1/03 | 119/472 |

OTHER PUBLICATIONS

Lee's, Komodo Kricket Keeper, Large, 8 Pages, https://www.amazon.com/Lees-20080-Kricket-Keeper-Small/dp/B001OVBDDM, date unknown, last visited Oct. 4, 2019.

* cited by examiner

ANIMAL CONTAINMENT SYSTEM

BACKGROUND OF THE INVENTION

The present invention relates generally to container systems and more particularly to advantageous improvements in cages used in breeding operations for small animals, and methods of using and manufacturing the same.

Prior small animal breeding cages have suffered from a variety of drawbacks. Primarily, it was formerly common for cage tops to be constructed of a wire mesh, most often a welded wire mesh. Prior welded wire mesh cage tops have been shown to be unsanitary, to lack structural integrity, and to lack uniformity. Wire mesh cage tops are unsanitary because incomplete welds and/or overlap in the wire mesh form tight interstices that are difficult to clean, providing a bacteriophilic environment. Structural integrity of wire mesh cage tops has been shown to degrade over time, with welds breaking and wires rusting through. A loss of structural integrity may pose a risk for animal escape, and may lead to injury of the contained animal or a caretaker. Wire mesh cage tops may also demonstrate a lacking uniformity in gap spacing, especially when subjected to rigorous cleaning and inattentive storage (e.g., stacking stresses). If certain gaps in a wire mesh become too large, there is risk of animal escape or intrusion by unwelcome pests.

Animal access to other cage components or accessories is another problem with prior designs. With respect to cage components, it is common for small animal cages to utilize a five sided (i.e., four sides with bottom) polypropylene or other plastic boxes (e.g., see-through Sterilite® boxes) for primary animal containment, and then to cover the box with a wire mesh top, as described above. The wire mesh, however, potentially allows a contained animal to access the upper edge of the box and begin gnawing its way to escape. Likewise, cage accessories, such as water bottles, may be supported by prior cage top designs, but the wire mesh construction may allow animal access to the bottle. If an animal is allowed to access a water bottle, then the bottle material must be selected carefully to preclude destruction by such access. This means that usually relatively more expensive water bottle materials (e.g., glass) are required to be used with prior cage top designs.

Accordingly, the art of small animal containment would benefit from systems and methods that address one or more of the drawbacks of prior systems.

SUMMARY OF THE INVENTION

According to an embodiment of a container top according to the present invention, the top (which may be integrally formed from a unitary piece of material, such as a sheet of stainless steel, stamped or otherwise cut or etched from stock material) includes a top surface (which may be an at least substantially planar surface) extending between and including at least one edge portion. A bottom surface is opposite the top surface, the bottom surface including a portion configured to mate on or about a majority of a lip of a container. A vent is formed (such as by molding, stamping, drilling, or laser etching) through the top surface and configured to allow a predetermined amount of ambient air exchange through the top surface. A feeding chute extends downward from the top surface and a plurality of feeding slots are formed through the chute. Along each of the at least one edge portion, a registration flap depending downward from the bottom surface, and configured to operatively maintain alignment with the container lip.

According to an aspect of a container top according to the present invention, the vent includes a plurality of apertures formed through the top surface. At least one of the apertures may be different from the others, or all apertures may be substantially identical. The apertures may be formed as regular or irregular geometric shapes, and preferably include at least seven hexagonal apertures arranged in a honeycomb pattern.

According to another aspect of a container top according to the present invention, the plurality of apertures may include a first central opening (e.g., for receiving, or configured to be covered by, a vent plate) surrounded by a second plurality of mounting apertures. In this arrangement, a first surface area of the top surface is voided by each of the second plurality of mounting apertures is less than one percent of a second surface area of the top surface voided by the central opening.

According to still another aspect of a container top according to the present invention, an aperture is formed through a portion of the chute, the aperture being configured to receive a ball bearing sipper tube coupled to a water supply implement, such as a water bottle or water supply line. An imperforate portion of the chute extending at least substantially around the aperture, the imperforate portion configured prevent physical access to the water supply implement through the container top.

According to yet another aspect of a container top according to the present invention, the chute may include a plurality of planar panels extending in a common direction. In one (and preferably only one) panel of the chute, and (additionally or alternatively to the feeding slots) at least one aperture is formed and configured to receive a capped tube. A plurality of such tube apertures may be formed through the chute, and a tube may extend through each aperture, wherein each tube comprises a closed end and an open end disposed on opposite sides of the one panel.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
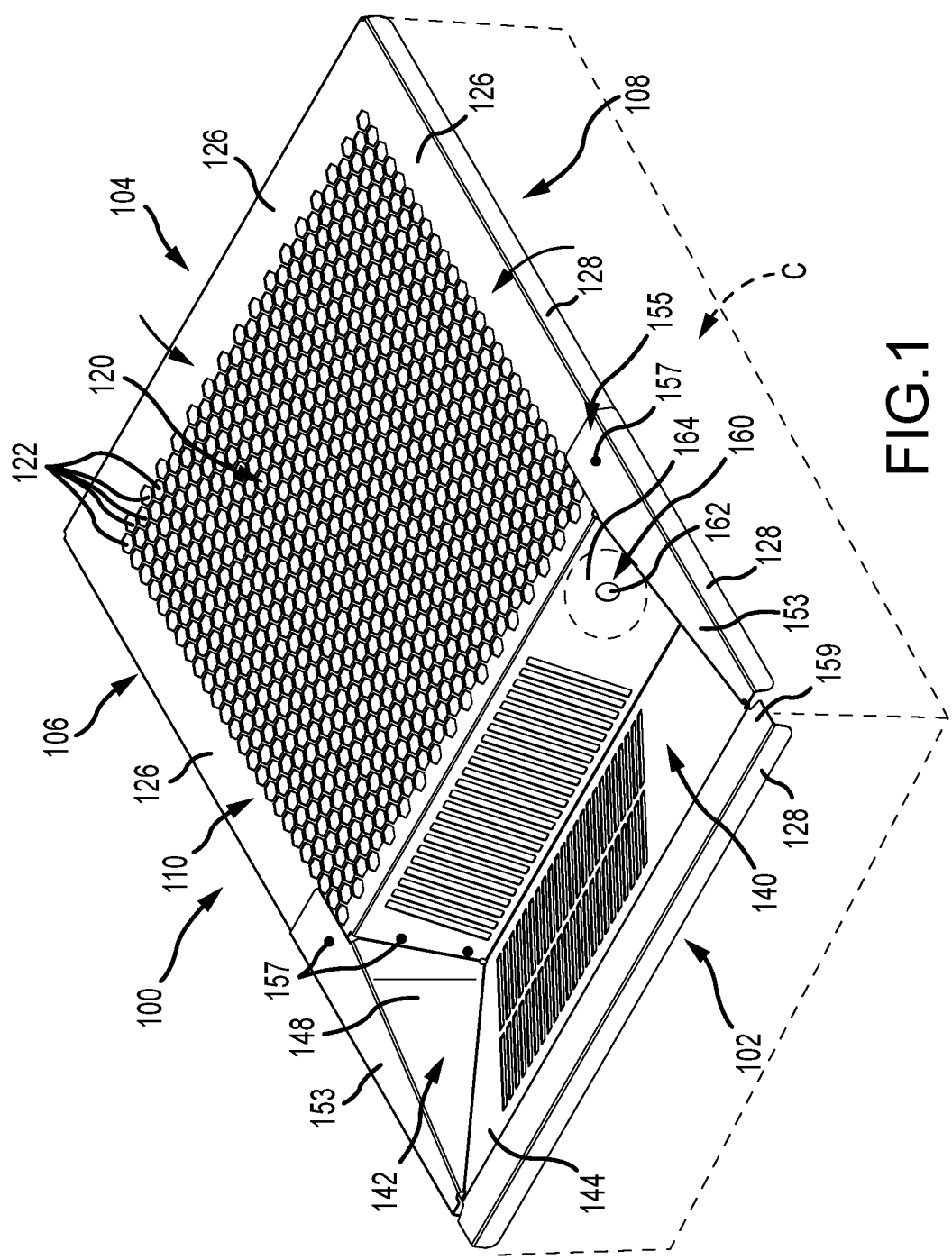
FIG. 1 is a perspective view of a first embodiment of a container top according to the present invention.
Figure 2:
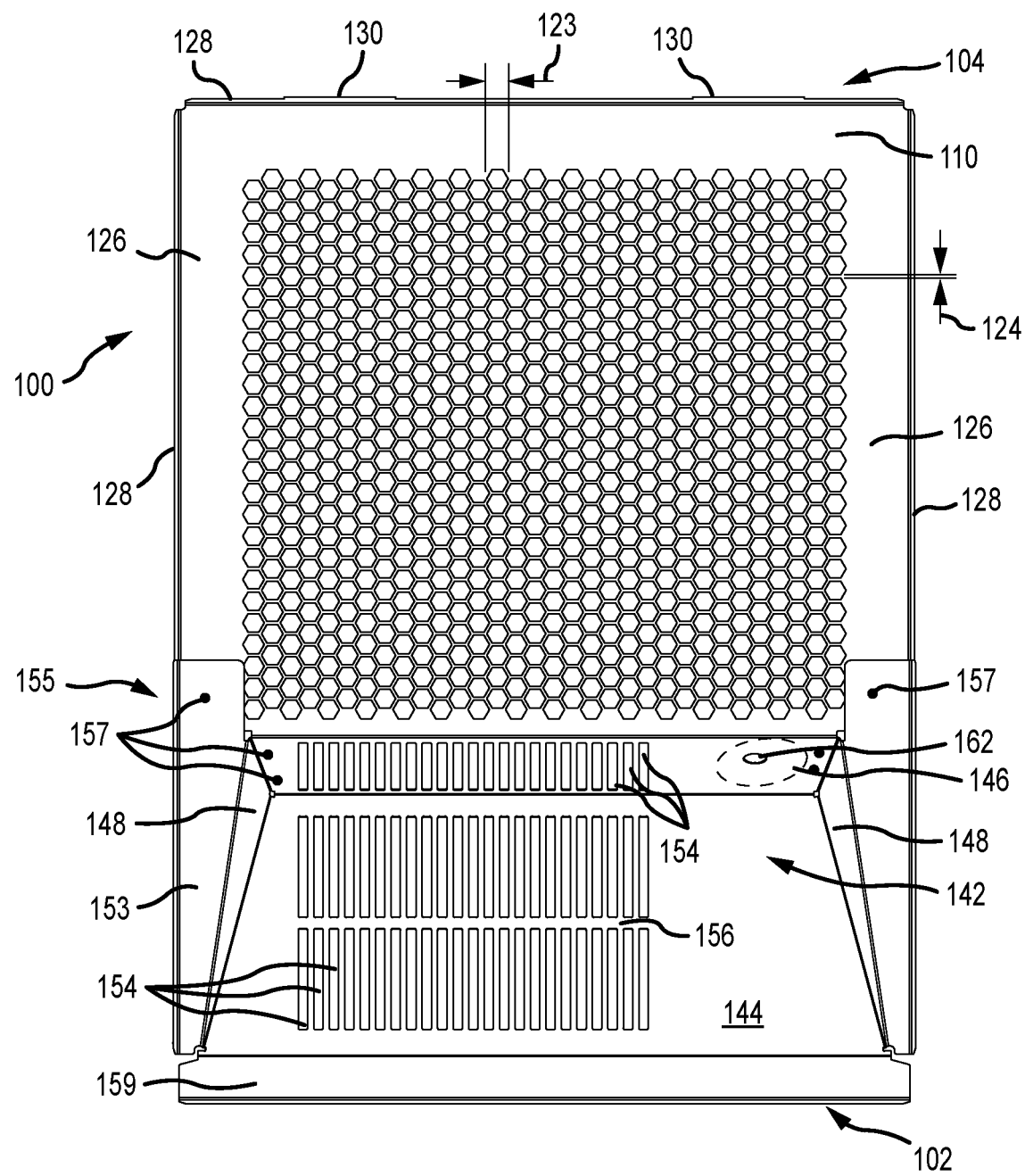
FIG. 2 is a top plan view of the embodiment of FIG. 1.
Figure 3:
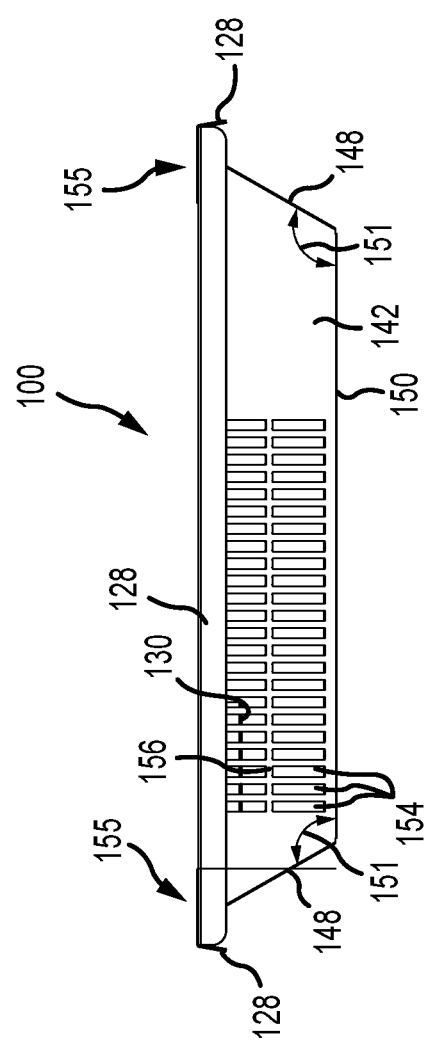
FIG. 3 is a front elevation view of the embodiment of FIG. 1.
Figure 4:
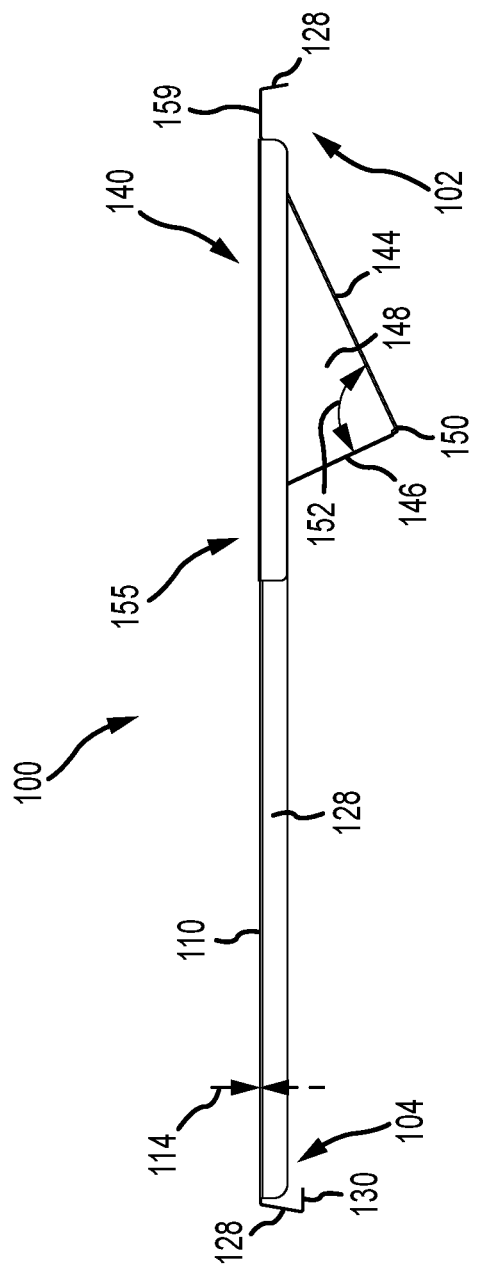
FIG. 4 is a left elevation view of the embodiment of FIG. 1.
Figure 5:
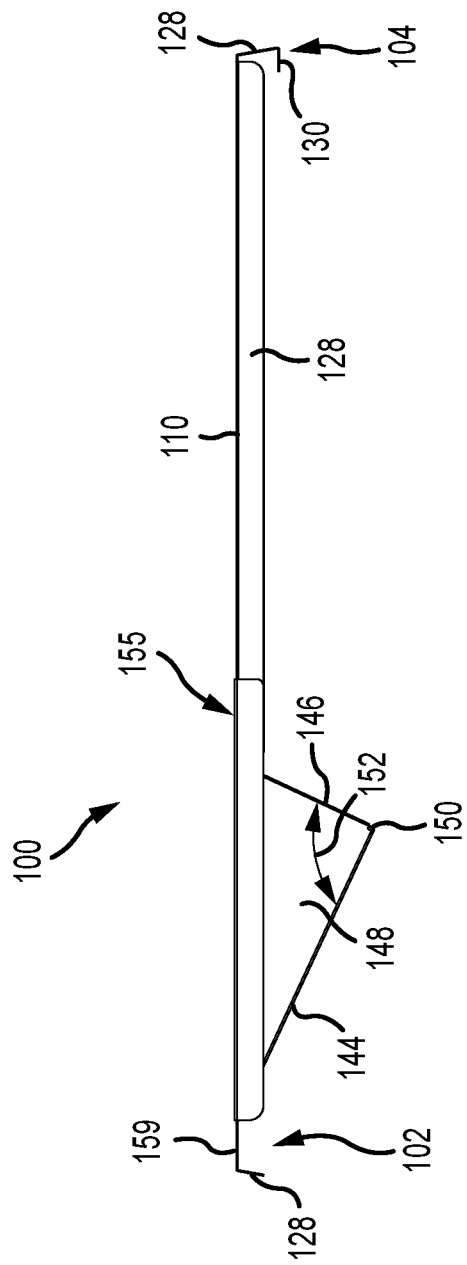
FIG. 5 is a right elevation view of the embodiment of FIG. 1.
Figure 6:
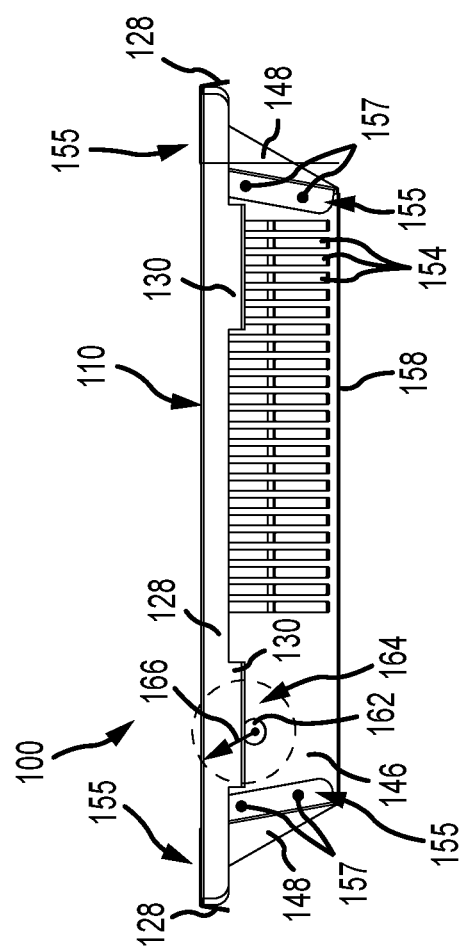
FIG. 6 is a rear elevation view of the embodiment of FIG. 1.
Figure 7:
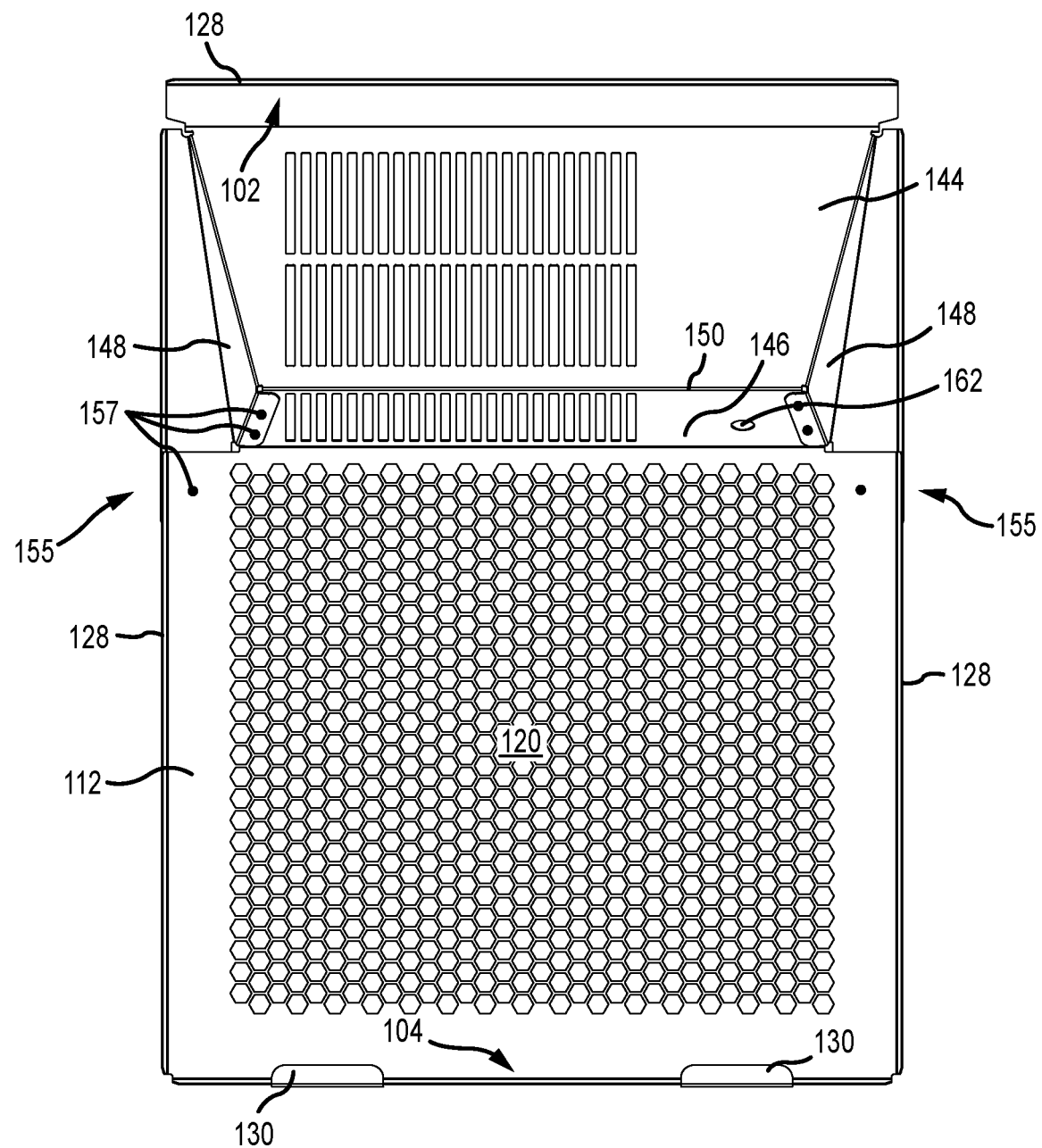
FIG. 7 is a bottom plan view of the embodiment of FIG. 1.

Turning to FIGS. 1-7, a first embodiment 100 of a container top according to the present invention may be positioned atop a known container C, such as a commercially available Sterilite® storage container, which is preferably substantially transparent.

The top 100 generally forms a rectangular shape extending from a front end 102 to a rear end 104, and from a left lateral side 106 to a right lateral side 108. Though described as rectangular, it should be understood that other shapes are contemplated, including regular geometric shapes and irregular shapes, any or all of which may be informed by an upper opening or lip of the container C with which the top 100 is to be used. The top 100 has a top surface 110 and opposed bottom surface 112, which are separated by a top thickness 114. The top surface 110 and bottom surface 112 are preferably substantially parallel to each other, thereby providing a substantially consistent thickness 114 throughout. The thickness 114 may be increased (e.g., doubled) in areas of overlap during construction, as further explained below.

Generally, the top 100 includes features to allow contained animals to live. The top 100 generally includes a vent portion 120, a feeding portion 140, and a watering portion 160. The vent portion 120 functions to allow gaseous exchange through the top 100, thereby allowing animals in the container C to breathe. The gaseous exchange may occur through natural or forced-air convection. The vent portion 120 preferably includes a plurality of apertures 122 formed through the entire top thickness 114. In this embodiment, the apertures 122 are formed as regular hexagonal apertures 122 in a stacked honeycomb arrangement (at least seven hexagons, including a central hexagon and one hexagon adjacent to each side of the central hexagon and at least two other hexagons), the apertures 122 having a maximum diameter 123 that is as large as possible to contain animals within the container C. A preferred aperture size and spacing includes apertures 122 having a diameter 123 of about 0.4284 inches (or ⅜" measured between parallel sides of the hexagonal aperture) and a framework spacing 124 of about 0.0625 inches (¹⁄₁₆").

Though other aperture shapes are contemplated, such as circles and other regular geometric shapes (e.g., equilateral triangles, squares, pentagons, etc.) and irregular geometric shapes (e.g., rectangles or other shapes having unequal side lengths) or even in particular graphic representations (e.g., in a shape of an indicating letter or number, or in a shape of a representative type of animal to be contained), stacked regular hexagons are preferred to maximize a collective aperture surface area (i.e., to provide the most open space through the cover 100) over a given top surface 110 area. As shown, the apertures 122 are arranged collectively in a pattern that preferably mimics an outer shape of the top 100, preferably extending over a majority of the top surface 110 area. The pattern extends between support margins 126 provided along sides of the top 100 intended to contact the lip of the container C. The support margins 126 are preferably imperforate, to provide structural support and to assist in preventing animal access to the lip of the container C by animals contained within the container C.

Extending downward from the support margins 126 are one or more registration flaps 128. The registration flaps 128 provide at least two functions. First, the flaps 128 assist in maintaining correct horizontal positioning (i.e. registration) of the top 100 upon a lip of the container C. Second, the flaps 128 help to prevent small animal gnawing of the lip of the container C by animals contained within the container C and even from outside of the container C. One or more (but preferably only one or two opposed) registration flaps 128 may include registration tabs 130 that are configured to extend under the lip of the container C to prevent vertical movement of that portion of the top 100 off of the container C and may further operate generally as a semi-hinge.

The feeding portion 140 acts as or holds a feeding hopper to allow animals in the container C to access nutrition through the top 100. The feeding portion 140 is coupled to the vent portion 120, such as by being integrally formed therewith. The feeding portion 140 generally includes a feeding chute 142 extending downward from the top surface 110 of the top 100. The chute 142 preferably includes a plurality of chute panels angled towards a common direction, the plurality of chute panels including a front or bottom panel 144, a rear panel 146, and two side panels 148. The front panel 144 and the rear panel 146 meet at a chute base bend 150 at an angle 152 of about seventy degrees to about 120 degrees, with greater than about ninety degrees being most preferred to enhance cleanability. Formed through at least one chute panel are a plurality of feeding slots 154. Though a variety of feeding slot shapes have been contemplated, a preferred shape is a longitudinal rectangle having a length that extends substantially perpendicular to the chute base bend 150. Structural support, such as a reinforcing rib 156, may be disposed within or between slots 154. Feeding slots 154 may be formed through only a single chute panel, but preferably are formed through the chute front panel 144 and rear panel 146. The same number of slots 154 may be placed perpendicular to and at predetermined locations along the bend 150 (as shown) or differing numbers on each panel may prove desirable. Slots 154 on the chute front panel 144 may be aligned with slots 154 provided on the chute rear panel 146.

Preferably extending between and coupled to the chute front panel 144 and chute rear panel 146 are the opposing chute side panels 148. The side panels 148 extend upwards from the chute base bend 150, preferably at an obtuse angle 151, to a chute side lip margin 153. The chute side lip margin 153 and each chute side panel 148 extends towards the rear end 104 further than the chute rear panel 146 panels to form overlaps 155 with the vent portion margin 126 and the chute rear panel 146, respectively. The overlaps 155 are preferably secured by suitable means, such as a tack weld 157. Extending towards the front end 104 from the front chute panel 144 is preferably a front lip margin 159, which is substantially parallel to the chute lip margin 153 and the vent portion margin 126. Depending from the front lip margin 159 is preferably another registration flap 128, as previously described. Accordingly, the registration flap(s) 128 and registration tabs 130 cooperate to form a surface to mate with a lip of the container C.

While combination of the vent portion 120 and the feeding portion 140 has been contemplated, such combination may not be preferred if the nutrition source (e.g., food) to be placed in the feeding portion 140 prohibits adequate gaseous exchange to operate as the vent portion 120. However, the feeding portion 140 and the vent portion 120 may be arranged in alternative ways (e.g., a feeding portion 140 could be provided on more than one side of the vent portion 120, or vice versa), but it remains preferred that the active feeding portion 140 (i.e., the part of the feeding portion used to receive food) not provide the sole air exchange.

The watering portion 160 holds a watering implement, such as an inverted water bottle (not shown), thereby allowing the animals in the container C to access hydration through the top 100. The watering portion 160 generally includes a watering aperture 162 surrounded by a chew shield 164. The aperture 162 may be provided through any suitable surface of the top 100, but is preferably provided through an extension of the rear chute panel 146, but spaced a predetermined distance from the nearest feeding slot 154. The aperture 162 is preferably sized (e.g. about 0.25" to about 0.5" in diameter) and configured to receive a ball bearing sipper tube (not shown), the sipper tube being generally known in the art of small animal care. The chew shield 164 preferably surrounds the watering aperture 162 for a predetermined minimum radius 166, such as about 0.75 to about 1.5 inches, with about one inch being preferred. While the chew shield 164 may include small perforations (not shown), the shield 164 is preferably provided as an imperforate (or at least free from openings large enough through which contained animal incisors could extend outwardly past the top surface to access the water supply implement) margin surrounding the watering aperture 162. In this way, animals within the container C are at least substantially prevented from contacting a water bottle or water supply line (e.g. vinyl water supply line) that may supply the ball bearing sipper tube. Accordingly, caretakers will be provided the option of using water supply implements made of a material (e.g., plastic, vinyl, rubber, etc.) sufficient for such supply purposes but which may otherwise succumb to sharp teeth of a contained animal.

Figure 8:
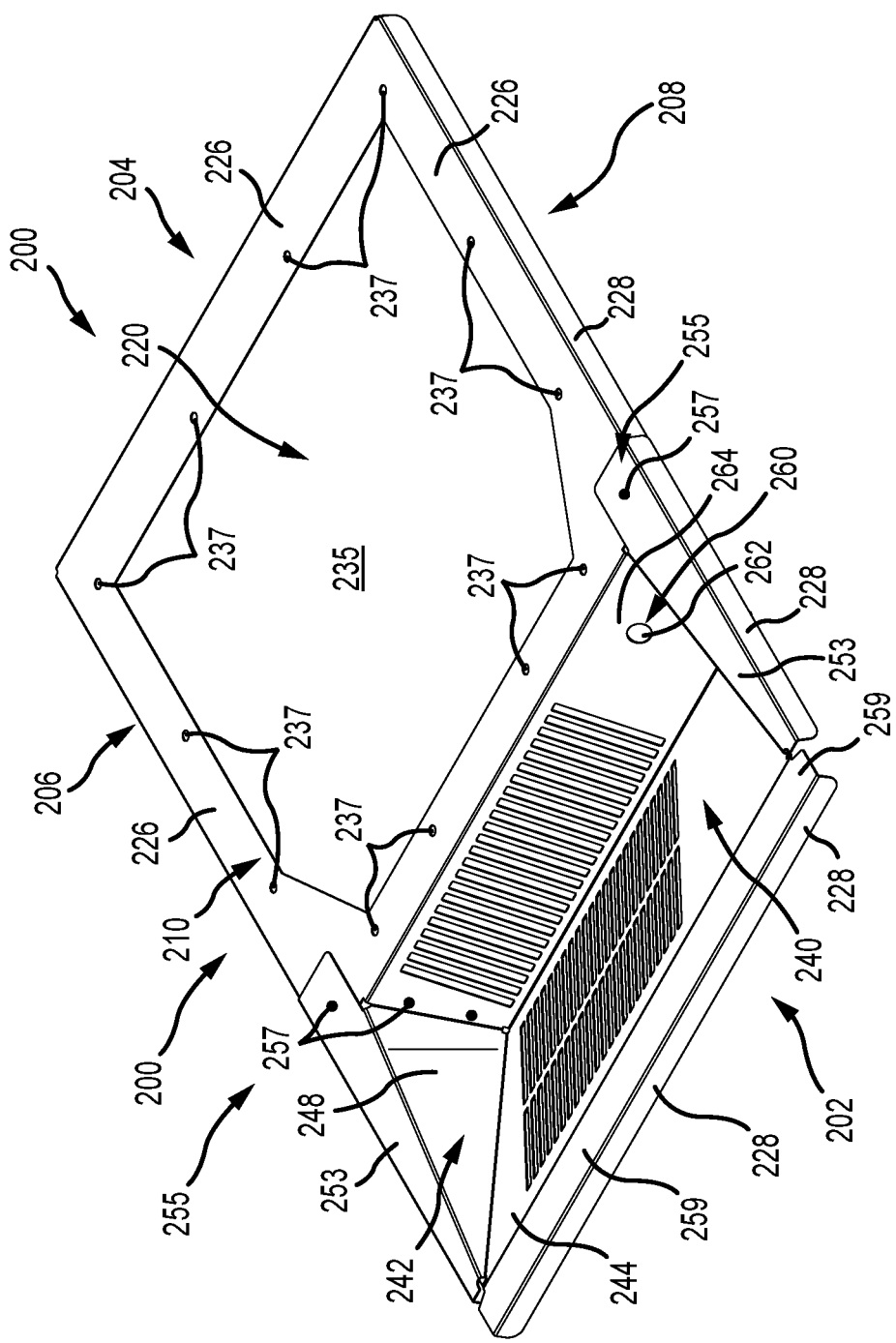
FIG. 8 is a perspective view of a second embodiment of a container top according to the present invention.
Figure 9:
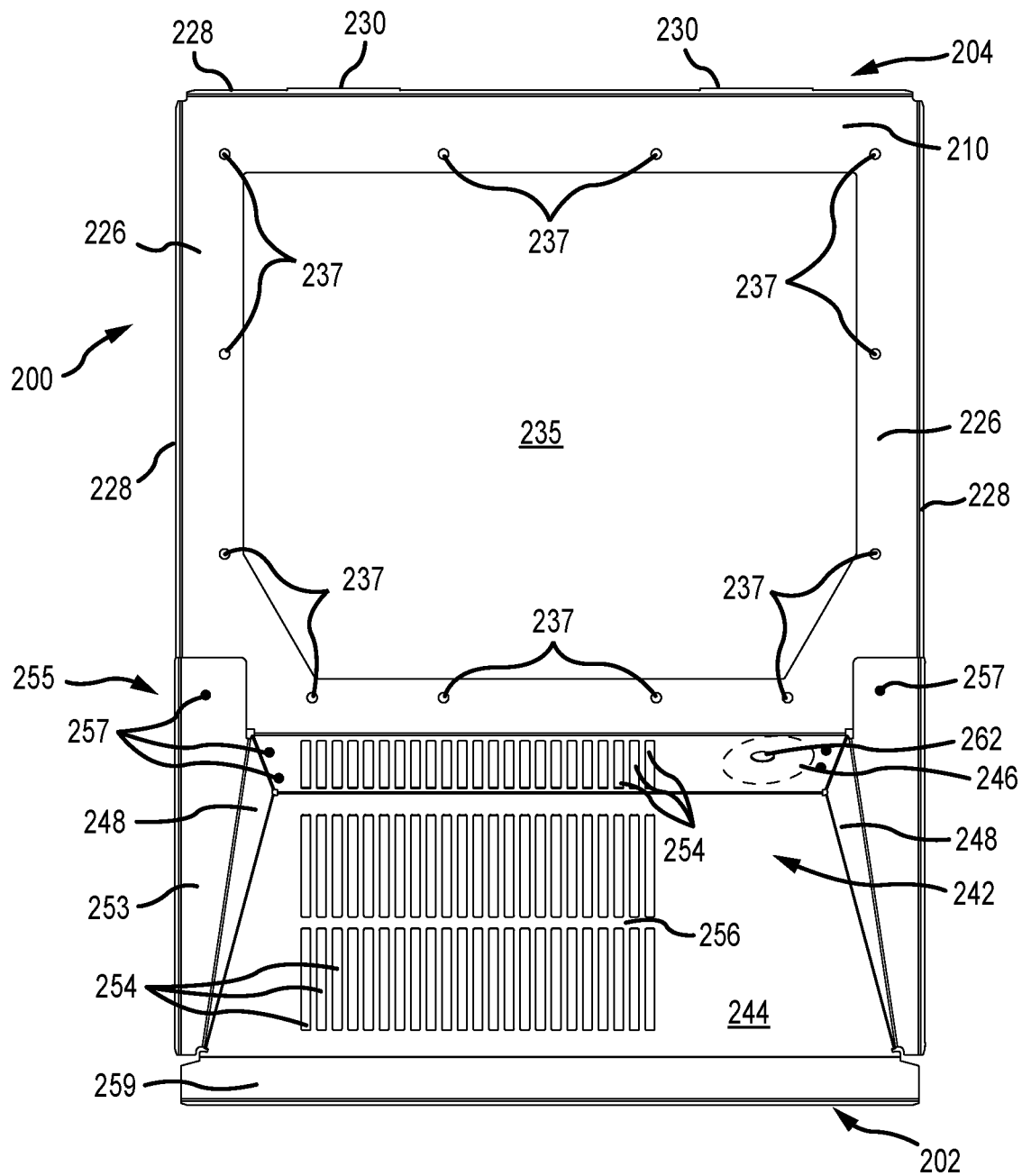
FIG. 9 is a top plan view of the embodiment of FIG. 8.
Figure 10:
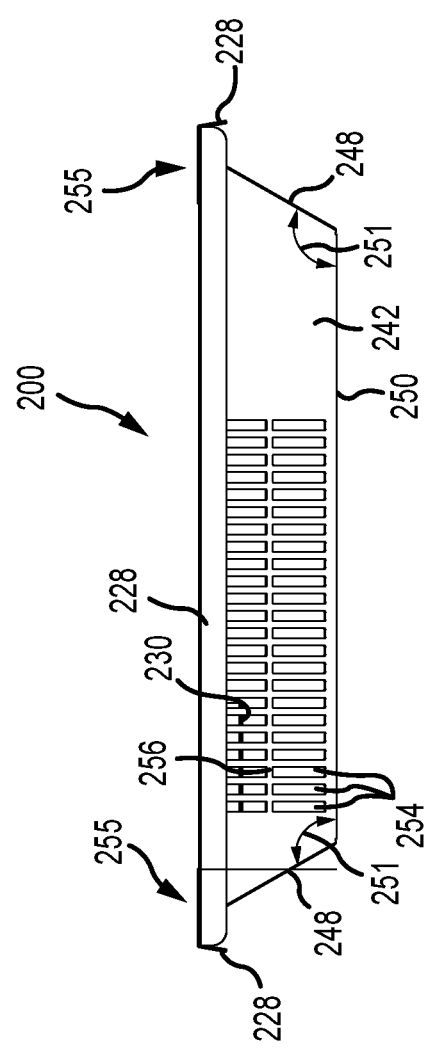
FIG. 10 is a front elevation view of the embodiment of FIG. 8.
Figure 11:
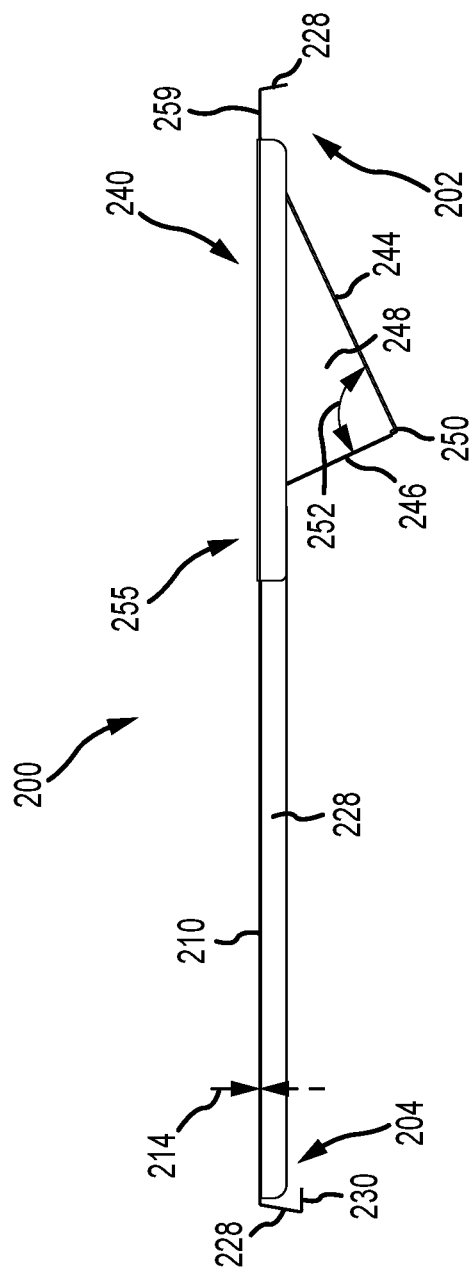
FIG. 11 is a left elevation view of the embodiment of FIG. 8.
Figure 12:
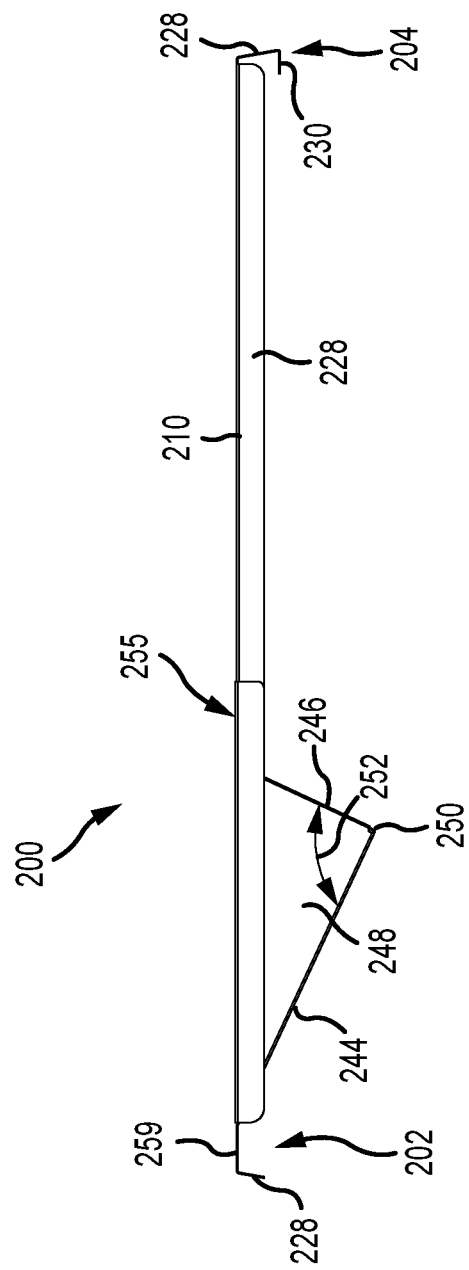
FIG. 12 is a right elevation view of the embodiment of FIG. 8.
Figure 13:
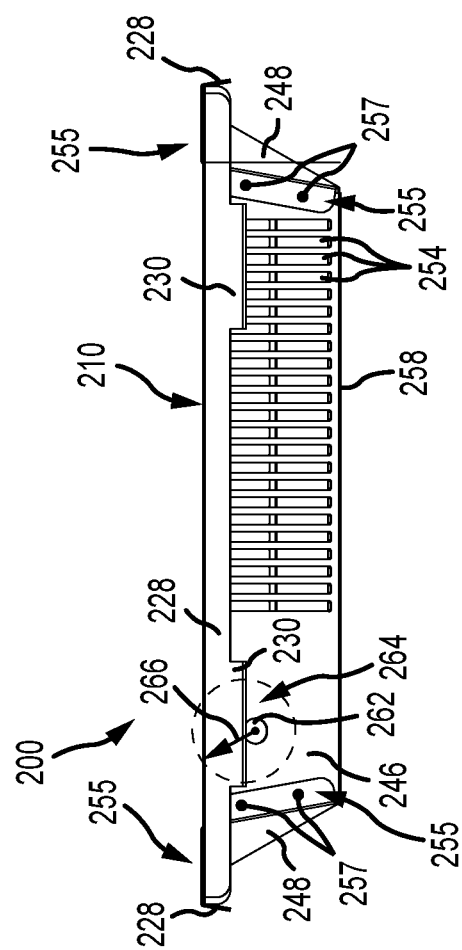
FIG. 13 is a rear elevation view of the embodiment of FIG. 8.
Figure 14:
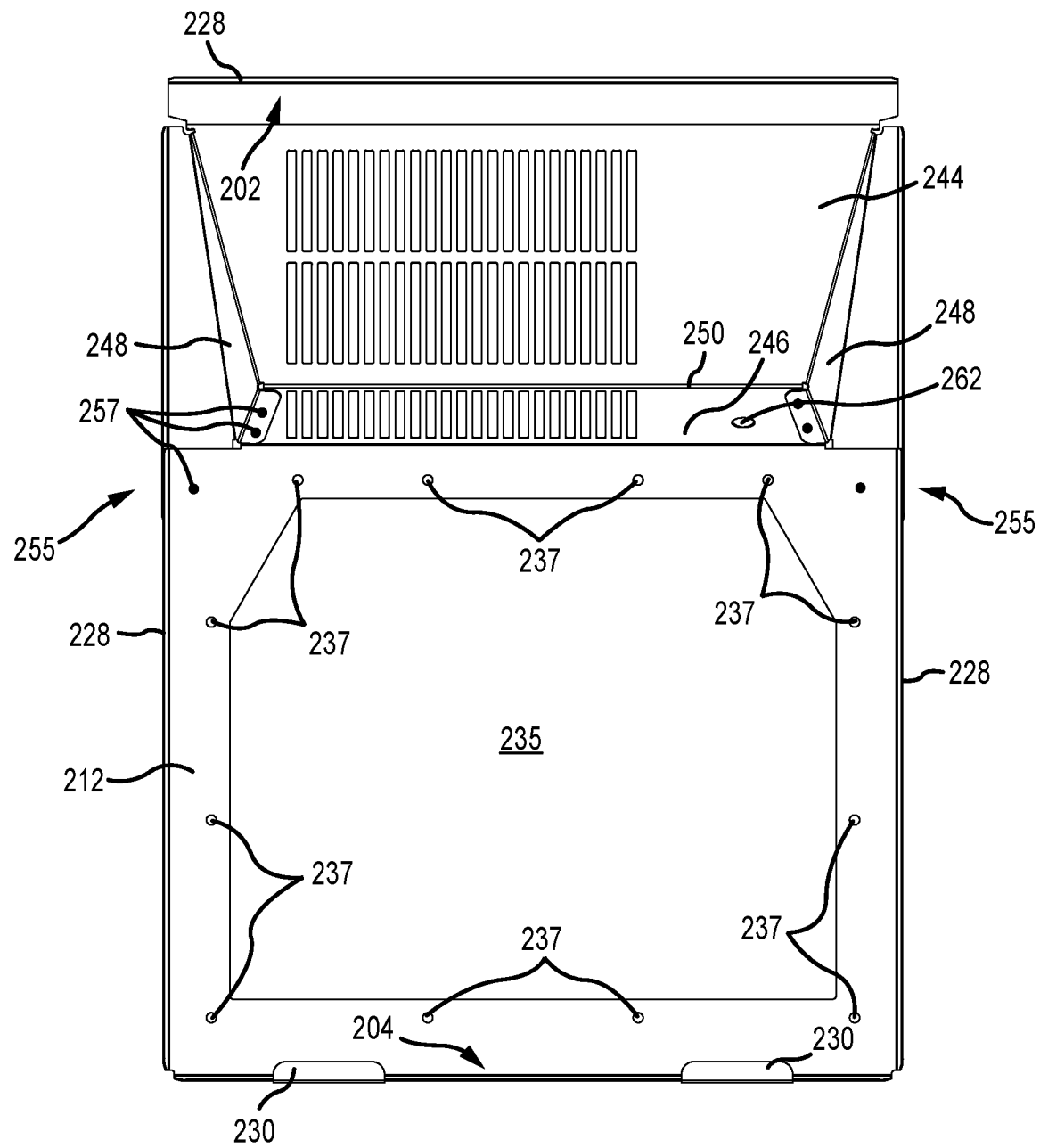
FIG. 14 is a bottom plan view of the embodiment of FIG. 8.

FIGS. 8-14 depict a second embodiment 200 of a container top according to the present invention, where like numbering refers to substantially similar or identical structure as described with respect to FIGS. 1-7. This container top embodiment 200 is substantially similar to the first embodiment 100 with the exception of having a selectively placeable and/or exchangeable vent structure (not shown) to be mounted as the vent portion. This embodiment 200 includes a vent void 235 surrounded by a plurality of vent mounting apertures 237, the mounting apertures 237 being substantially smaller than the vent void 235. The vent void 235 eliminates a majority of the top 200 and provides an opening over which a vent portion may be coupled. For instance, a substantially planar plate having a predetermined vent pattern or no vent pattern may be coupled over the void 235 and secured to the top 200, such as by rivets extending through the mounting apertures 237.

Figure 15:
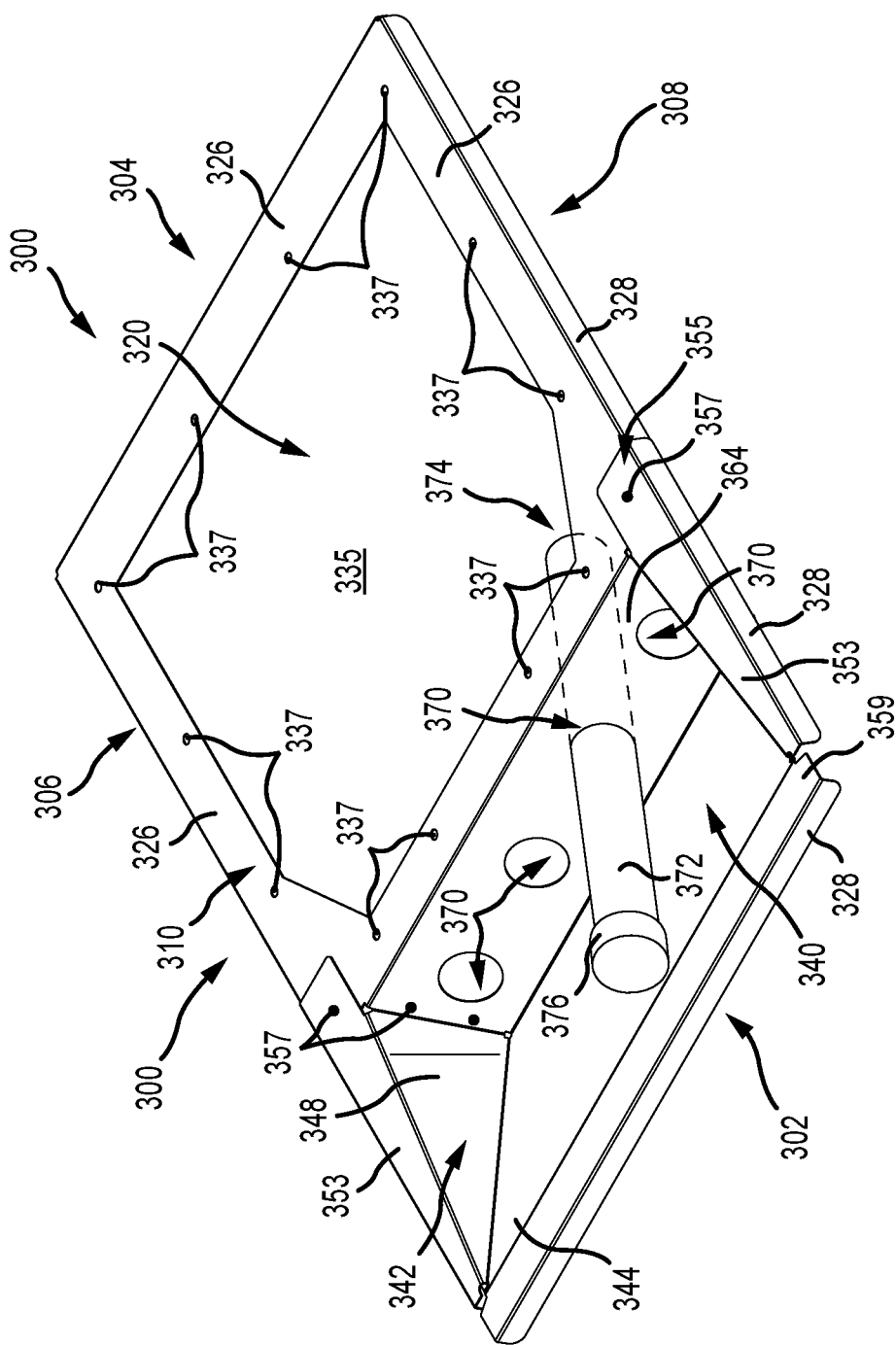
FIG. 15 is a perspective view of a third embodiment of a container top according to the present invention.
Figure 16:
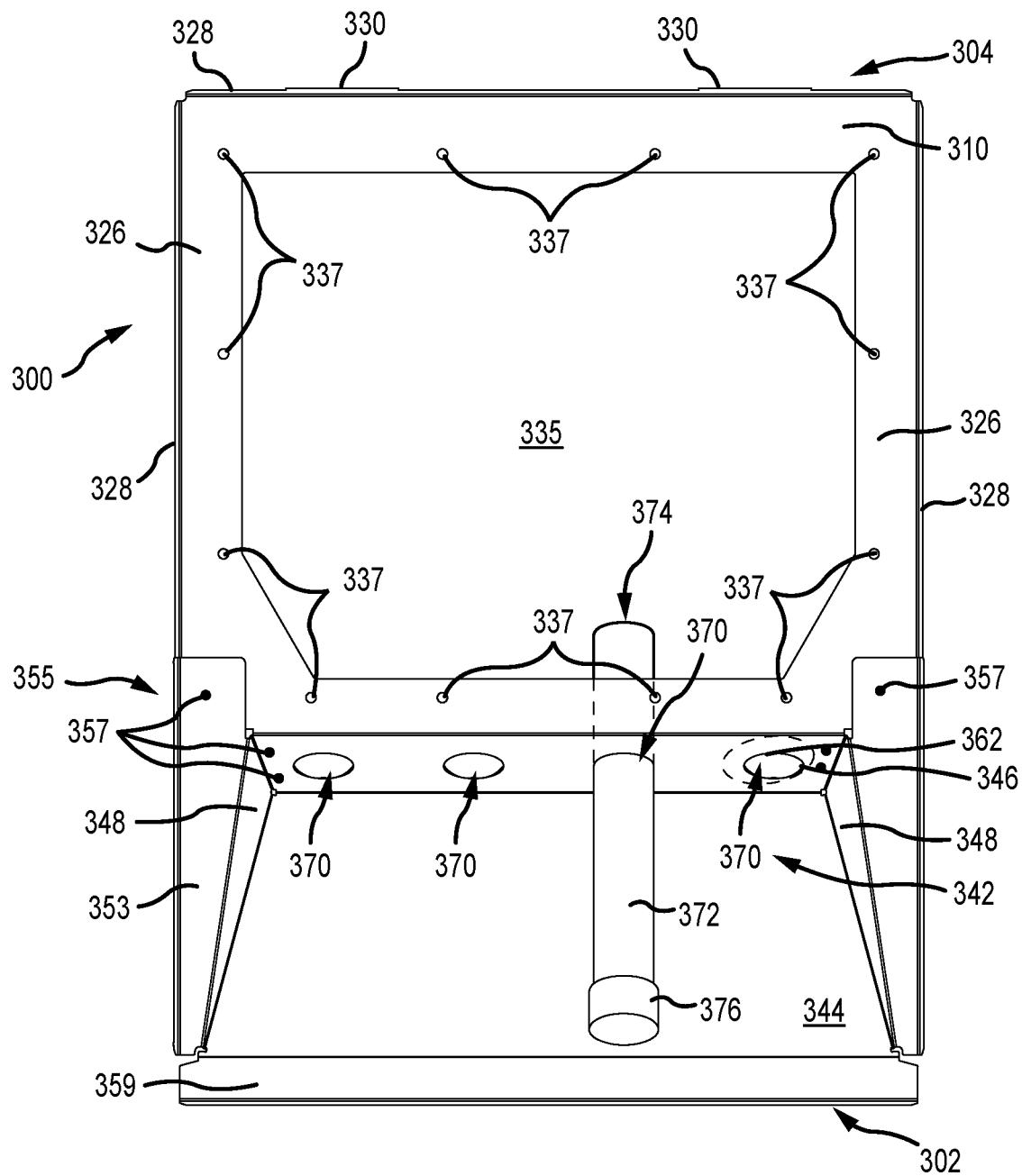
FIG. 16 is a top plan view of the embodiment of FIG. 15.
Figure 17:
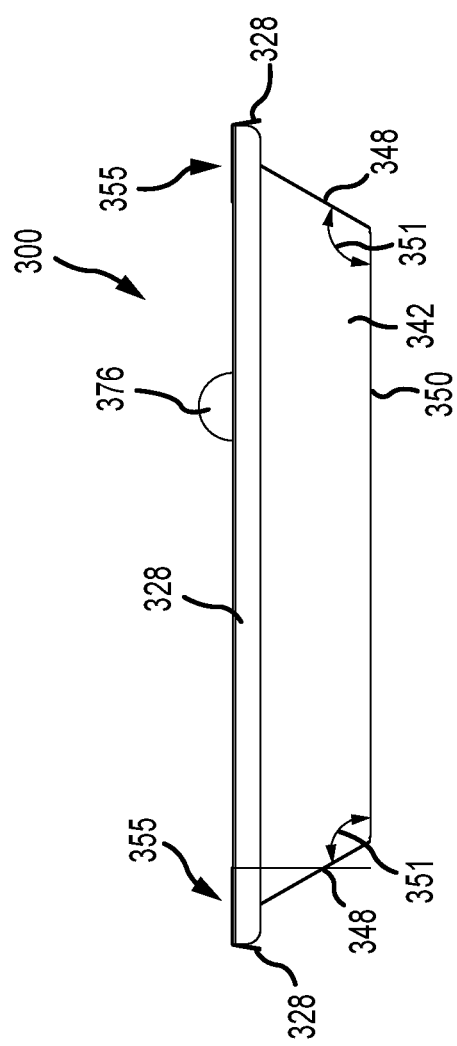
FIG. 17 is a front elevation view of the embodiment of FIG. 15.
Figure 18:
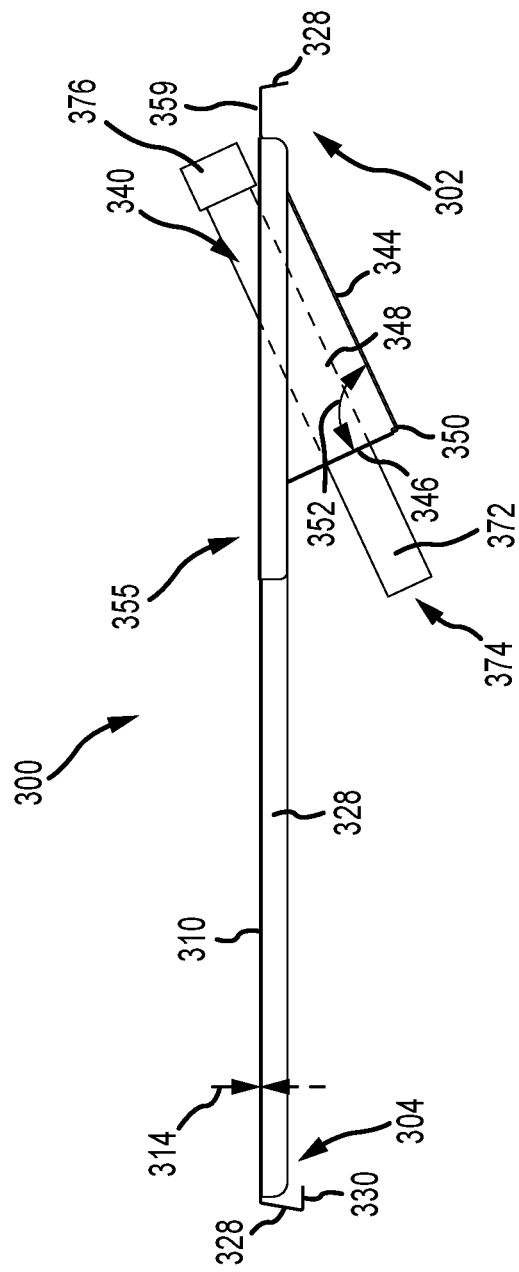
FIG. 18 is a left elevation view of the embodiment of FIG. 15.
Figure 19:
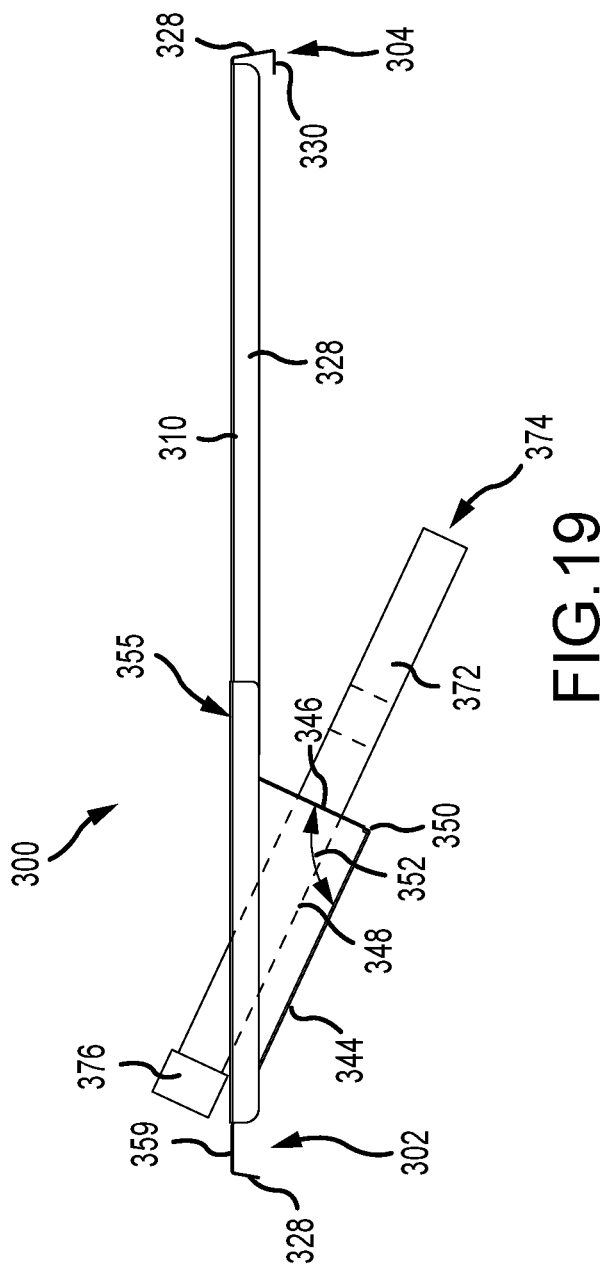
FIG. 19 is a right elevation view of the embodiment of FIG. 15.
Figure 20:
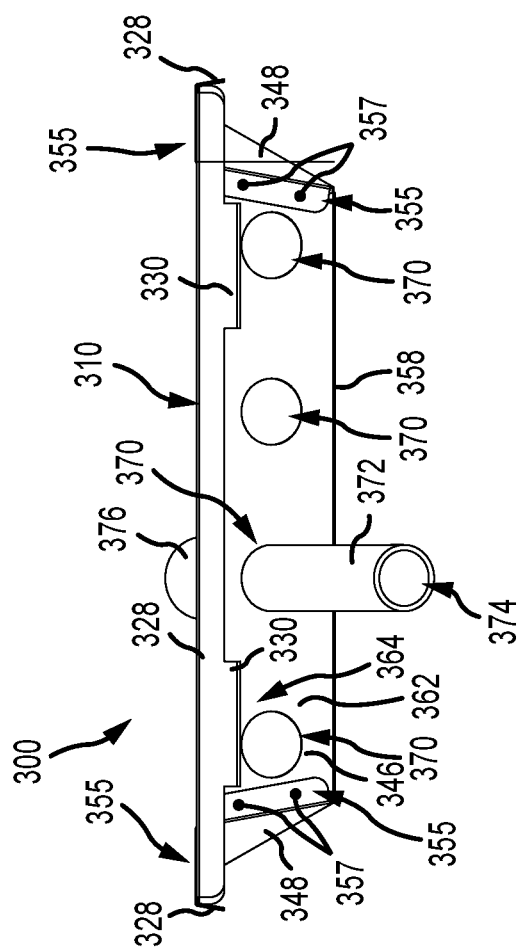
FIG. 20 is a rear elevation view of the embodiment of FIG. 15.
Figure 21:
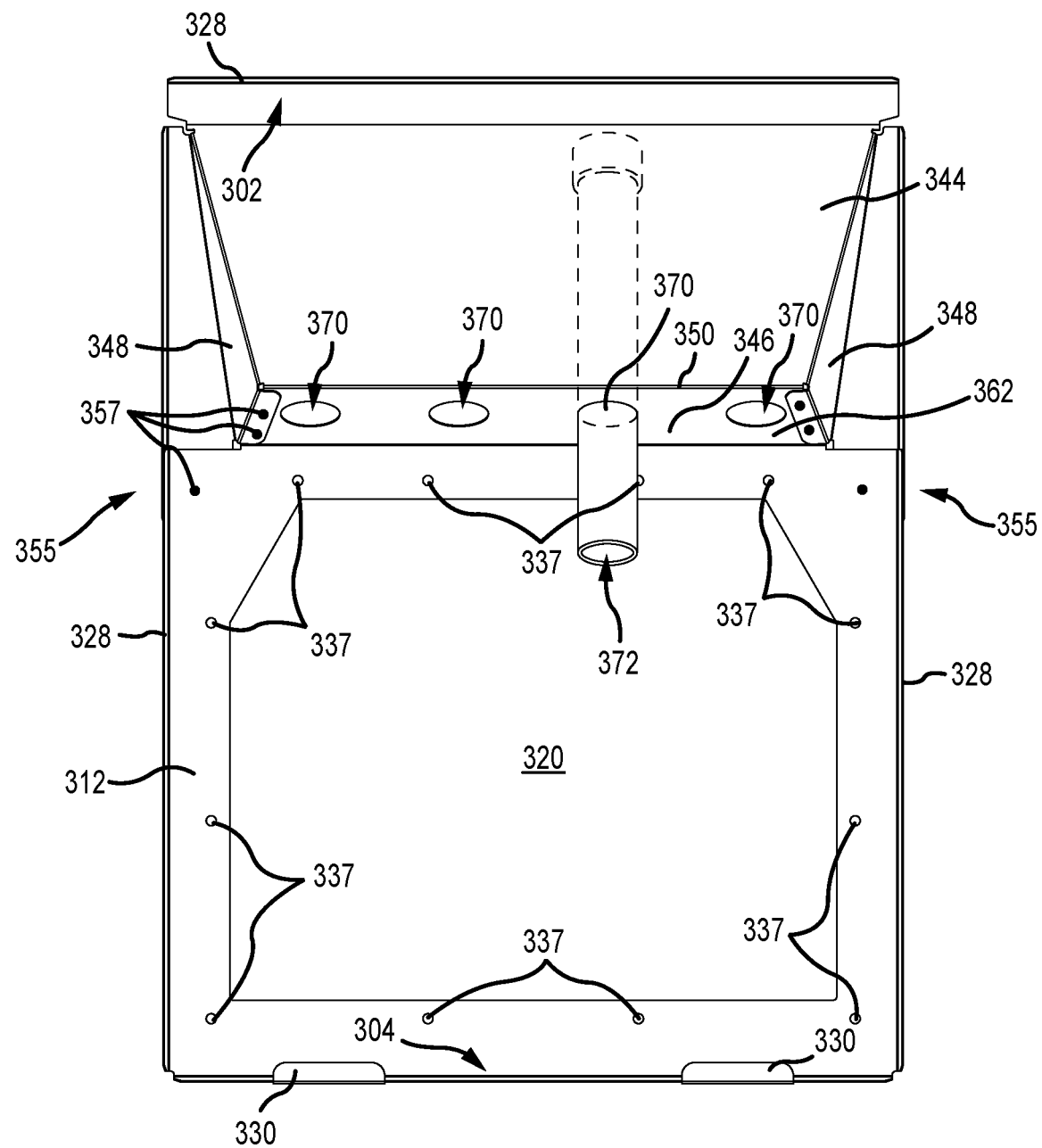
FIG. 21 is a bottom plan view of the embodiment of FIG. 15.

FIGS. 15-21 show a third embodiment 300 of a container top according to the present invention, where like numbering refers to substantially similar or identical structure as described with respect to FIGS. 8-14. This container top embodiment 300 is substantially similar to the second embodiment 200 with the exception of including one or more animal access apertures 370. While the apertures 370 may be simply plugged (e.g., with a rubber stopper) and unplugged when access is desired, the apertures 370 are preferably sized and configured to receive animal handling implements. This embodiment 300 is especially useful in maintaining animals that are known to enjoy resting in, hiding in, or escaping to dark and/or confined spaces. For example, it is known that crickets enjoy hiding in dark and/or confined spaces. Thus, the apertures 370 may be sized and configured to receive cricket handling implements, such as a cricket tube 372 (i.e., a hollow, preferably opaque tube (e.g. a polyvinyl chloride (PVC) tube) open on one end 374 and capped 376 or otherwise closed on the other). While the animal access apertures 370 may be formed through any suitable surface of the container top 100, it has been determined that placement of the aperture(s) 370 on the chute rear panel 346 results in advantageous accessibility. It should be noted that while the embodiment 300 is shown to include only animal access aperture(s) 370, the chute 342 may additionally include more or more feeding slots (like slots 154, 254) or other voids or structure.

Container tops according to the present invention are preferably formed from or as a sheet of material, such as a sheet metal and/or metal alloys (e.g., steel, copper, aluminum, tin, brass) or even injection molded plastic, and/or stamped and/or cut sheet plastic. Most preferably, container tops according to the present invention are either stamped or laser cut from a single sheet of stainless steel, such as 24-gauge stainless steel. An entire top 100, 200, 300 can be stamped or cut from the single sheet. After forming the outline and any/all voids, the registration flaps 128, 228, 328 and tabs 130, 230, 330 can be bent into place, as can the chute panels. Finally, preferably lastly, the overlaps 155, 255, 355 can be tacked in place with adhesive or welding. To use a container top according to the present invention, the bottom surface generally adjacent the registration flaps is placed atop a lip of a container C. For the second and third embodiments disclosed, a vent panel (not shown) is preferably secured in place prior to use, such as by using rivets or nuts and bolts placed through the mounting apertures 237, 337. While tops are most preferably formed from a single unitary piece of material, embodiments may be alternatively constructed from multiple pieces adhered, welded, or otherwise bonded or coupled.

The foregoing is considered as illustrative only of the principles of the invention. Furthermore, since numerous modifications and changes will readily occur to those skilled in the art, it is not desired to limit the invention to the exact construction and operation shown and described. For instance, while terms like "top" and "bottom" are used throughout, the terms are intended for general reference. Though technically such terms may include precise top (vertically above) and bottom (vertically below) directionality, such precision is not required to fall within the scope of the description. While the preferred embodiment has been described, the details may be changed without departing from the invention, which is defined by the claims.

What is claimed is:

1. A container top comprising:
   a top surface extending between and including a plurality of edge portions;
   a bottom surface opposite the top surface, the bottom surface configured to mate with a majority of a lip of a container;

a vent formed through the top surface, the vent configured to allow air exchange through the top surface;

a chute extending downward from the bottom surface, the chute comprising a pair of planar panels meeting at a chute base bend;

along each of the plurality of edge portions, a registration flap depending downward from the bottom surface;

a first plurality of apertures formed through one panel of the chute; and a plurality of tubes, each tube extending through one of the first plurality of apertures, wherein each tube comprises a closed end and an open end disposed on opposite sides of the one panel.

2. The container top according to claim 1, the top comprising a unitary piece of material.

3. The container top according to claim 1, the vent comprising a second plurality of apertures formed through the top surface.

4. The container top according to claim 1, the top surface comprising a substantially planar surface.

5. The container top according to claim 3, the top formed by a process comprising:

providing a sheet of stainless steel;

working the sheet of stainless steel to form an outline, the first plurality of apertures, and the second plurality of apertures, the working comprising at least one of stamping and laser cutting;

bending the sheet of stainless steel to form the registration flap; and bending the sheet of stainless steel to form the chute.

\* \* \* \* \*